(12) United States Patent
Fuller

(10) Patent No.: US 12,019,556 B2
(45) Date of Patent: Jun. 25, 2024

(54) SYSTEM SUPPORT FOR PERSISTENT CACHE FLUSHING

(71) Applicant: Oracle International Corporation, Redwood Shores, CA (US)

(72) Inventor: Benjamin John Fuller, Concord, MA (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 17/704,889

(22) Filed: Mar. 25, 2022

(65) Prior Publication Data

US 2022/0318152 A1 Oct. 6, 2022

Related U.S. Application Data

(60) Provisional application No. 63/168,974, filed on Mar. 31, 2021.

(51) Int. Cl.
| | |
|---|---|
| *G06F 12/0891* | (2016.01) |
| *G06F 1/32* | (2019.01) |
| *G06F 12/0804* | (2016.01) |
| *G06F 12/0831* | (2016.01) |
| *G06F 13/16* | (2006.01) |

(52) U.S. Cl.
CPC ........... *G06F 12/0891* (2013.01); *G06F 1/32* (2013.01); *G06F 12/0804* (2013.01); *G06F 12/0833* (2013.01); *G06F 13/1668* (2013.01); *G06F 2212/60* (2013.01)

(58) Field of Classification Search
CPC .... G06F 12/0891; G06F 1/32; G06F 12/0804; G06F 12/0833; G06F 13/1668; G06F 2212/60; G06F 1/30; G06F 12/0868
See application file for complete search history.

(56) References Cited

U.S. PATENT DOCUMENTS

| | | | |
|---|---|---|---|
| 8,949,633 B2 * | 2/2015 | Belmont | G06F 9/4418 713/323 |
| 9,588,565 B1 | 3/2017 | Harland et al. | |
| 9,971,534 B2 * | 5/2018 | Starr | G06F 1/3275 |
| 10,474,583 B2 | 11/2019 | Jenne et al. | |

(Continued)

FOREIGN PATENT DOCUMENTS

WO 2017/023270 A1 2/2017

*Primary Examiner* — Sean D Rossiter
(74) *Attorney, Agent, or Firm* — Invoke

(57) ABSTRACT

Techniques are described herein for flushing volatile system memory to persistent memory after the loss of alternating current (AC) power. In some embodiments, the techniques include implementing an extended hold-up window long enough to complete a full flush of processor caches and memory controller buffers using energy available in the bulk capacitors of one or more power supplies after a power outage event. The voltage on the bulk capacitors within the one or more power supply units may be monitored, and a notification may be triggered when a programmable threshold voltage is detected on the bulk capacitors. The system may configure the voltage threshold to indicate that a certain minimum amount of energy used to successfully complete a cache flush operation is available. The techniques allow flushing volatile system caches without relying on battery backup units (BBUs), which may be cumbersome to install and maintain.

20 Claims, 9 Drawing Sheets

(56) References Cited

U.S. PATENT DOCUMENTS

| | | |
|---|---|---|
| 2005/0281057 A1 | 12/2005 | Jung et al. |
| 2011/0010569 A1* | 1/2011 | Obr .................... G06F 1/30 |
| | | 713/340 |
| 2012/0108224 A1* | 5/2012 | Cheng ............ H04W 52/0277 |
| | | 455/418 |
| 2016/0179667 A1* | 6/2016 | Kumar ............... G06F 11/0778 |
| | | 711/135 |
| 2017/0060668 A1* | 3/2017 | Farhan ............... G06F 12/0871 |
| 2017/0168747 A1 | 6/2017 | Han et al. |
| 2017/0168937 A1 | 6/2017 | Bahali et al. |
| 2017/0255520 A1* | 9/2017 | Han .................... G06F 11/1076 |
| 2017/0262375 A1 | 9/2017 | Jenne et al. |
| 2018/0032390 A1 | 2/2018 | Rahmanian et al. |
| 2018/0097986 A1 | 4/2018 | Kanumuri et al. |
| 2018/0276124 A1 | 9/2018 | Chen et al. |
| 2019/0012101 A1 | 1/2019 | Jenne |
| 2019/0042418 A1 | 2/2019 | Dutta et al. |
| 2019/0121710 A1 | 4/2019 | Bulusu et al. |
| 2019/0236029 A1* | 8/2019 | Butcher ............. G06F 12/0246 |
| 2020/0105312 A1 | 4/2020 | Matze et al. |
| 2020/0264980 A1 | 8/2020 | Wang et al. |

\* cited by examiner

SYSTEM SUPPORT FOR PERSISTENT CACHE FLUSHING

INCORPORATION BY REFERENCE; DISCLAIMER

The following application is hereby incorporated by reference: application No. 63/168,974 filed on Mar. 31, 2021. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to cache management techniques. In particular, the present disclosure relates to techniques for flushing volatile cache states upon power loss events.

BACKGROUND

Modern server designs often incorporate persistent memory (PMEM), such as Data Center Persistent Memory Modules (DCPMMs) or non-volatile dual in-line memory modules (NVDIMMS), into the memory architecture. Persistent memory provides several advantages over block-based persistent media including low latency random access times and the ability to directly perform remote direct memory access (RDMA) operations into persistent memory.

Committing data directly to persistent memory devices is expensive, and servers with persistent memory typically support treating some volatile on-chip state as persistent in order to limit the number of explicit commit operations software is required to perform. If the system can guarantee that the state of a volatile buffer will be flushed to persistent memory upon all resets or power transitions that would otherwise destroy the content stored within the volatile buffer, then programs may treat any data committed to the volatile buffer as persistent. One such approach for flushing volatile buffers is referred to as asynchronous dynamic random access memory refresh (ADR) whereby volatile buffers in the memory controller are included in the persistent domain. According to this approach, the system reserves a small amount of energy necessary to keep the system powered following the loss of power for long enough to flush the volatile memory controller buffers out to persistent memory devices.

Another technology, referred to as enhanced ADR (eADR) or persistent cache flushing (PCF), expands the volatile state which can be handled as persistent to include all processor caches and on-chip buffers. Typically, processor caches are orders of magnitude larger than the volatile memory buffers in the memory controller. Thus, the system requires significantly more energy to complete the flush process. Servers which support persistent cache flushing must include some form of auxiliary energy storage to power the system during the persistent cache flush operation. Some servers include a battery backup unit (BBU) to provide sufficient energy to complete flushing data out of the processor caches into persistent memory after power has been lost. BBUs may store a significant amount of energy; however, they suffer from numerous challenges including a large footprint, limited ability to supply the high currents required by server systems, thermal constraints, and additional costs.

Asynchronous hardware reset events further complicate the implementation of persistent cache flushing mechanisms. Asynchronous hardware resets are typically implemented by directly asserting a reset request pin and may not be detectable by processor or chipset's power sequencing logic. If the system allows externally initiated reset events to trigger a hardware reset without invoking a persistent flush handler prior to the reset, then the persistent memory state may not be properly flushed. If applications rely on persistent cache flushing when not fully supported by the platform hardware, then application data may become lost or corrupted during power disruption events.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE SEVERAL VIEWS OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
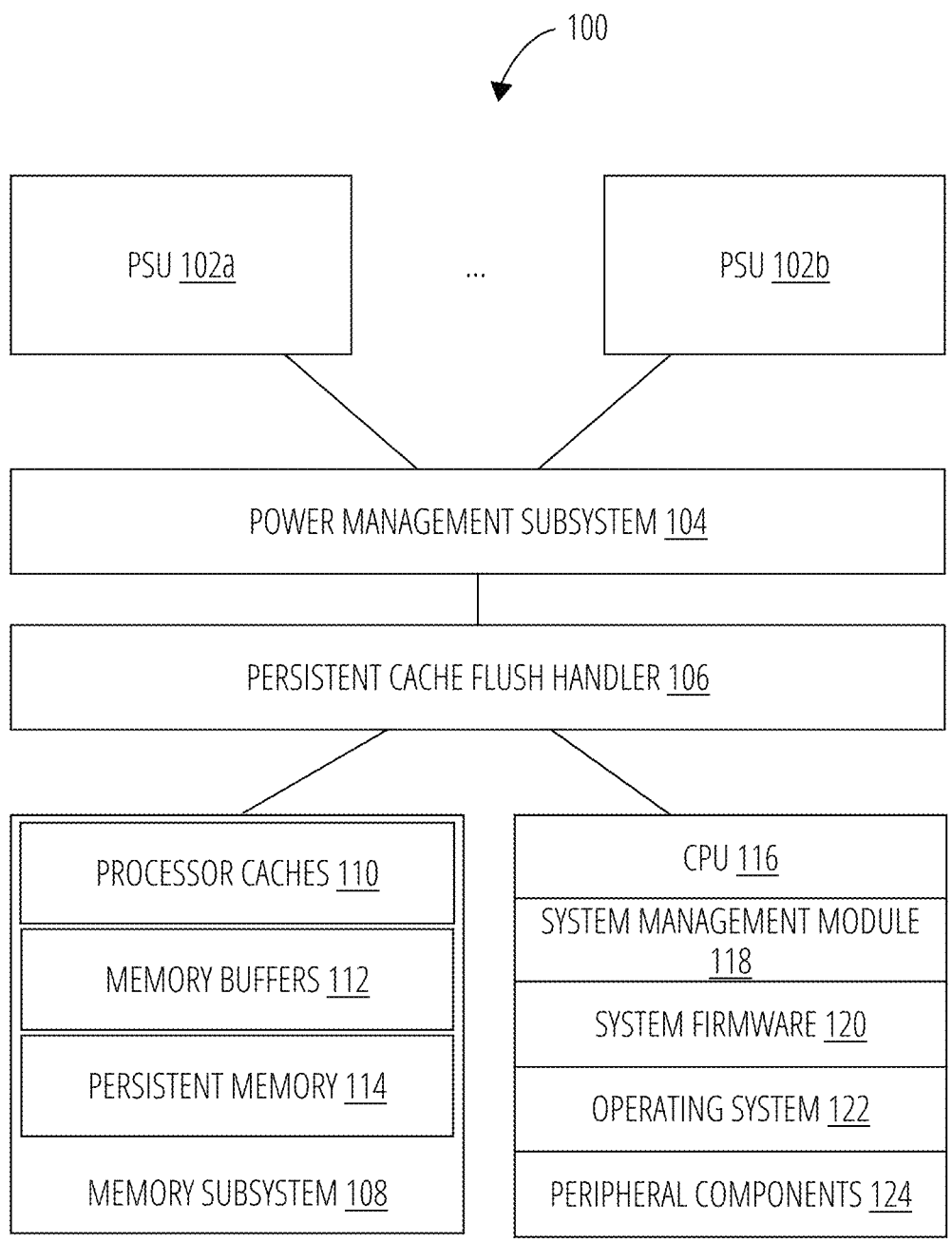
FIG. 1 illustrates a system for performing persistent cache flush operations in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein for utilizing system power supply units (PSUs) to provide auxiliary energy for flushing volatile system memory to persistent memory after the loss of alternating current (AC) power. In some embodiments, the techniques include implementing an extended hold-up window long enough to complete a full flush of processor caches and memory controller buffers using energy available in PSU bulk capacitors after a power outage event. The techniques may enable flushing the volatile system caches without requiring a BBU even though the amount of energy available in a PSU is relatively small compared to most BBUs.

Many PSUs include a bulk capacitor that allows the system to handle a temporary 10 milliseconds (ms) loss of AC power. An example PSU implementation is to assume the worst-case output load and provide a 10 ms timer which turns off the supplies outputs when the timer expires. This implementation limits the maximum hold-up window that may be implemented by the PSU to 10 ms regardless of the system power consumption, which may not be enough time to flush all system caches.

In some embodiments, PSUs are implemented to extend the hold-up window for an indefinite window of time determined by system power consumption rather than a fixed window of time. The voltage on the bulk capacitors within one or more PSUs may be monitored, and a notification may be triggered when a programmable, power-failure warning threshold voltage is detected on the bulk capacitors. The system may configure the voltage threshold to indicate that a certain minimum amount of energy required to successfully complete a cache flush operation is available in the PSU. The PSU may further implement a second voltage threshold associated with the minimum amount of energy required to safely sequence down the system's power rails. Since both notifications are based upon the amount of energy available in the PSU's bulk capacitors, the system may implement a configurable hold-up window whose duration is determined by the system's power consumption rather than a fixed duration. As a result, the system may define an operating point to minimize energy consumption rather than being constrained by fixed duration timers.

In some embodiments, system logic may implement an energy counter that estimates the total amount of energy available across all the installed PSUs and generates an interrupt signal to invoke the persistent flush handler when the estimated total system energy has reached a threshold associated with the minimum energy required to successfully complete a cache flush operation. The system logic may implement an energy counter for each PSU installed in the system. After a PSU has generated a power failure warning signal to the system logic, the system logic may start decrementing the energy counter associated with that PSU at a rate proportional to the number of active power supplies in the system and the system's mode of operation. The system logic may estimate the total energy available by summing each of the per PSU counters. When the total estimated energy drops below a critical threshold value, the system logic may generate an interrupt signal to invoke the persistent cache flush handler.

In some embodiments, the system is configured to reduce power consumption during the flush process to minimize the amount of energy required to complete a flush. Processors, persistent memory devices, and supporting circuitry may remain powered. Other system components that are not involved in the flush process, such as fans, input/output (I/O) devices, and hard-disk drives, may have power disabled. The power control loops in the system may further contain hooks to decrease central processing unit (CPU) power consumption such as by reducing processor frequency.

To ensure volatile system resources containing state considered to be persistent are properly flushed to persistent media prior to a system reset or power transition, in some embodiments, all resets or power transitions are preceded by the execution of a persistent flush handler responsible for pushing all volatile state out to persistent media prior to the reset or power transition. The system may trap accesses to registers that are used to initiate resets or power-state transitions and initiate a persistent cache flush prior to allowing the trapped write to complete. Trapping accesses to the registers allows the system to run a cache flush handler prior to performing the requested reset or power transition action. A similar mechanism may be implemented to handle resets and power transitions requested by platform entities external to a host subsystem.

System resets and power transitions may occur not only in response to power outages but also in response to events initiated by external agents. For example, certain system errors may trigger a hardware (HW) initiated system reset. As another example, a user may initiate a warm reset or a forced power down by holding a button or flipping a switch. If the system allows externally initiated reset or power transition events to trigger a hardware reset without invoking a flush handler prior to the reset, then the data residing in volatile processor caches or memory buffers may be lost. To ensure that externally initiated system resets or power transitions properly invoke the persistent flush handler, the system may proxy these asynchronous events through system logic, which generates an interrupt to invoke a special persistent flush interrupt handler that performs a persistent cache flush prior to invoking the HW operation requested. Additionally or alternatively, the system may include a HW backup mechanism to ensure all resets and power-transitions requested in HW reliably complete within a bounded window of time independent of whether the persistent cache flush handler succeeds.

Techniques described herein further provide a handshake mechanism and protocol for notifying an operating system whether system hardware supports persistent cache flushing. The system may determine whether the hardware is capable of supporting a full flush of processor caches and volatile memory buffers in the event of a power outage or asynchronous reset. If the hardware is capable, then persistent cache flushing may be selectively enabled and advertised to the operating system. Once persistent cache flushing is enabled, the operating system may treat data committed to volatile processor caches as persistent. If disabled or not supported by system hardware, then such data may be subject to loss through a power failure or reset event and the platform may not advertise support for persistent cache flushing to the operating system.

One or more embodiments described in this Specification and/or recited in the claims may not be included in this General Overview section.

2. System Architecture

In some embodiments, the techniques described herein are implemented on one or more computing devices, such as a server appliance or other network host, that includes persistent memory in the memory layout. While example computing architectures are provided herein, the techniques are applicable to a variety of different computing architectures, which may vary depending on the particular implementation. The techniques may be used to (a) determine whether a particular combination of system components are capable of supporting persistent cache flushing, (b) configure system components to enable persistent cache flushing if supported, and/or (c) execute a persistent cache flushing handler prior to power transitions or resets if persistent cache flushing is enabled.

FIG. 1 illustrates a system for performing persistent cache flush operations in accordance with some embodiments. As illustrated, FIG. 1 includes PSU 102a, PSU 102b, power management subsystem 104, persistent cache flush handler 106, memory subsystem 108, CPU 116, system management module 118, system firmware 120, peripheral components 124, and operating system 122. In other embodiments, system 100 may include more or fewer components than the components illustrated in FIG. 1. In some cases, components illustrated in FIG. 1 may be local to or remote from each other.

PSU 102a and PSU 102b convert electrical power into a form that allows proper operation of components of system 100. In some embodiments, PSU 102a and PSU 102b convert AC power into direct current (DC) energy used to power components of system 100. Additionally or alternatively, PSU 102a and PSU 102b may comprise a DC-to-DC power convert, such as a converter that steps up or steps down an input voltage. PSU 102a and PSU 102b may be electrically coupled to other components of system 100 via one or more power rails, such as a +3 Volt (V), +5V, and/or +12V rail. Although two PSUs are illustrated, system may have only a single PSU or additional PSUs, depending on the particular implementation.

Power management subsystem 104 controls the delivery of power to components of system 100 by the system PSUs. In some embodiments, power management subsystem 104 selectively powers down components during reset or power outage events to gracefully shutdown system 100. Additionally or alternatively, power management subsystem 104 may monitor voltage levels across the bulk capacitors in PSU 102a and PSU 102b. If the voltage level falls below a programmable threshold, then power management subsystem 104 may assert or de-assert a signal to notify other components of system 100.

Memory subsystem 108 includes volatile and non-volatile storage areas. In some embodiments, the volatile storage areas include processor caches 110 and memory buffers 112. Processor caches 110 may include caches within CPU 116, such as a level 3 (L3) and level 4 (L4) cache, which may be used by CPU 116 to reduce data access times to main memory. Memory buffers 112 may include registers in CPU 116 and/or a memory controller that provides intermediate storage for data being transferred between different areas. For example, a memory controller buffer may provide temporary storage to data that is being transferred between processor caches 110 and main memory.

Persistent memory 114 includes one or more non-volatile memory device, such as Data Center Persistent Memory Modules (DCPMMs) and non-volatile dual in-line memory module (NVDIMM). In some embodiments, persistent memory 114 is byte-addressable and resides on the memory bus, providing similar speeds and latency as volatile DRAM, which is typically much faster than peripheral non-volatile storage devices that do not reside on the memory bus, such as hard disks and flash drives. Further, persistent memory 114 may be paged and mapped by operating system 122 in the same manner as volatile DRAM, which is generally not the case with other forms of persistent storage. Persistent memory 114 may serve as main memory within system 100. In other cases, main memory may include one or more volatile memory modules, such as DRAM.

When a persistent cache flush handler is installed and platform signaling mechanisms are enabled, data stored within volatile memory areas, including processor caches 110 and memory buffers 112, may be treated as part of the persistent memory state even in the event of power outages or other power transition events. To maintain the persistent state, cache flush handler 106 executes and manages cache flush operations responsive to detecting triggering events. If persistent cache flush operations are not enabled, then a full cache flush may not be performed during power transition events, and some or all of the data may be subject to loss within the volatile memory areas. Without a persistent cache flush handler, data from memory buffers 112 may be flushed but not processor caches 110, which may reduce the amount of time required to perform a flush operation.

System management module 118 comprises software and/or hardware for managing system-level operations. In some embodiments, system management module 118 includes a service processor (SP) and a CPU chipset. System management module 118 may interface with one or more sensors to monitor hardware components. Additionally or alternatively, system management module 118 may perform other functions including trapping writes to system registers, generating system management interrupts (SMIs), and monitoring system boot status.

System firmware 120 comprise software providing low-level control of system hardware. In some embodiments, system firmware 120 includes software, such as basic input/output system (BIOS) firmware, that manages a booting process when the system is powered on or reset. System firmware 120 may further provide runtime services for operating system 122, such as managing persistent cache flush operations and peripheral components 124.

Operating system 122 includes software that supports operations including scheduling instruction execution on CPU 116, providing services to software applications, and controlling access to peripheral components 124. In some embodiments, system firmware 120 may advertise the ability to include cache contents in the persistence domain if supported by system 100. Operating system 122 may then selectively enable or disable persistent cache flushing. When enabled, operating system 122 may treat data committed to volatile memory, including processor caches 110 and memory buffers 112, as persistent.

Peripheral components 124 include auxiliary hardware devices such as hard disks, input devices, display devices, and/or other output devices that may be electrically coupled with other components of system 100. The power consumption of system 100 may vary based in part on which peripheral components 124 are connected and active. A worst-case scenario maximum power load may be computed by assuming that all hardware components, including peripheral components 124, are operating at full capacity.

3. Persistent Cache Flushing

3.1 Managing Cache Flush Operations During Power Disruption Events

When AC power is disrupted, it may not be desirable to immediately trigger a cache flush operation since power may be quickly restored. However, there is a risk that hold-up energy within PSU 102a and PSU 102b will be insufficient to perform a full cache flush if too much time passes without the power being restored. If persistent cache flushing is enabled, then the persistent memory state may become corrupted. To maintain the persistent state, power management subsystem 104 may generate a warning signal when remaining energy within the bulk capacitors of PSU 102*a* and PSU 102*b* drops below a threshold level.

Figure 2:
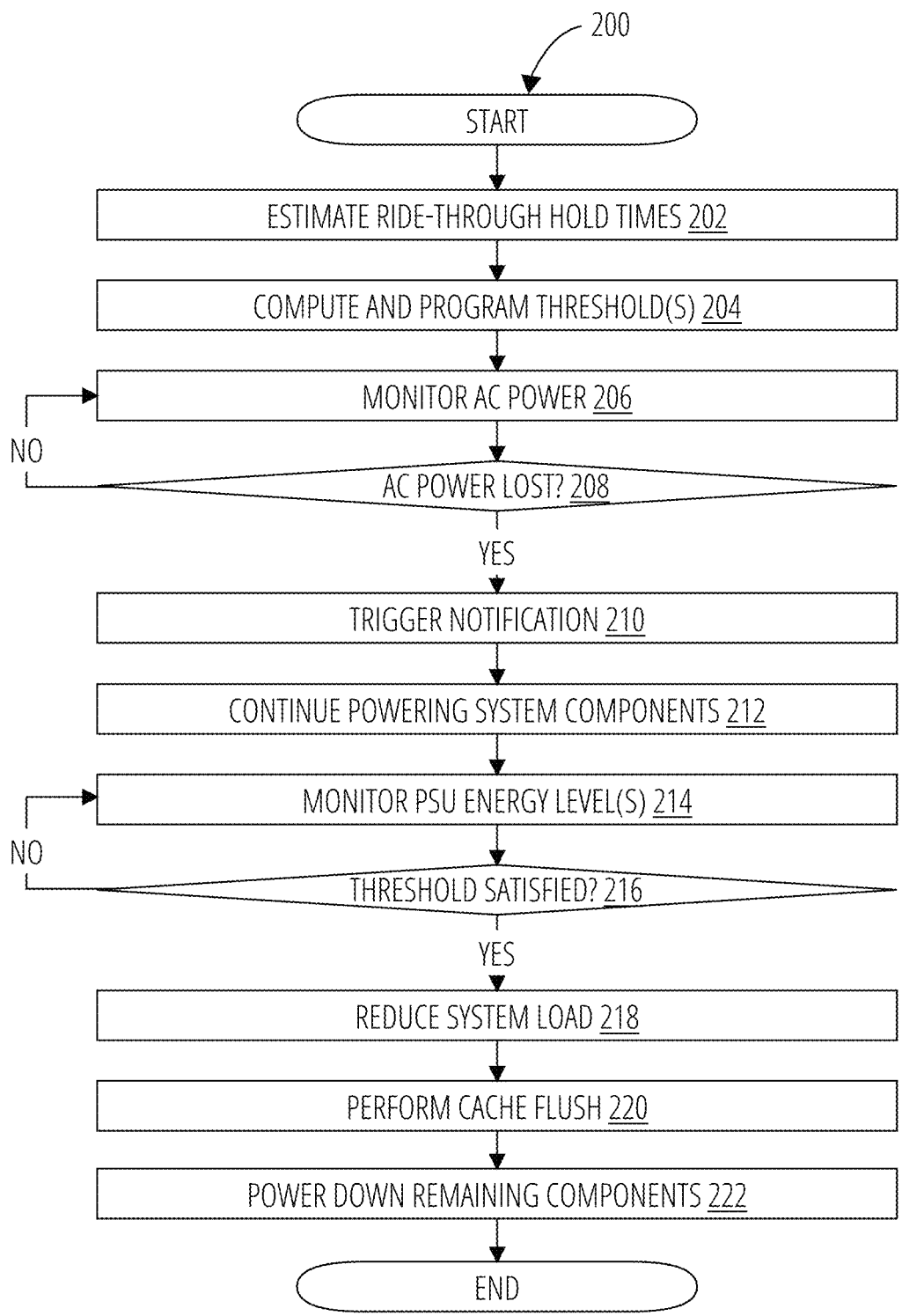
FIG. 2 illustrates an example set of operations for executing persistent cache flushing operations to maintain a persistent memory state in accordance with some embodiments.

FIG. 2 illustrates an example set of operations for executing cache flush operations to maintain a persistent memory state in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, process 200 includes estimating a total amount of ride-through time and hold-up time based on system load (operation 202). The ride-through time corresponds to an estimated amount of time that system 100 may operate without AC power while leaving sufficient energy to perform a cached flush and sequence down the power rails. The hold-up time corresponds to the amount of time to perform a full cache flush and sequence down the power rails given the system load. The estimates may be computed based on a full system load or a reduced system load bounded to a maximum as described further herein.

In some embodiments, process 200 programs one or more energy thresholds based on the estimated ride-through time and hold-up time (operation 204). For example, process 200 may estimate a voltage level in a PSU's bulk capacitors that would guarantee system 100 the estimated amount of hold-up time under a bounded system load to complete the cache flush and sequential power rail shutdown operations. The voltage level may then be programmed as a threshold. In other implementations, a time may be set based on the estimated ride-through time rather than a voltage/energy-based threshold.

In some embodiments, operations 202 and 204 are implemented as a separate process from the remaining operations described herein. For example, operations 202 and 204 may be performed during a boot sequence for system 100, which may calculate the amount of energy required and associated voltage threshold for each operating point. The calculations may be performed based in part on which system components the boots sequence detected and the estimated power requirements to run the components during normal operations and/or a reduced power operating mode. The boot sequence may then set the programmable voltage thresholds for system 100. In other embodiments, the programmable thresholds may be set or modified through user input. For instance, a system administrator may set the programmable voltage thresholds for each operating point, allowing the system administrator to inject domain knowledge about the system power requirements.

Referring again to FIG. 2, process 200 includes monitoring for the loss of AC power (operation 206). In some embodiments, system 100 includes sensors and/or circuitry, which may be embedded in PSU 102*a* and/or PSU 102*b*, that detects when input AC power is disrupted. In other embodiments, external circuitry and/or sensors may signal system 100 when AC power is lost.

Based on the monitoring circuitry, process 200 may detect the loss of AC power (operation 208). In response, process 200 triggers a notification (operation 210). In some embodiments, the notification is triggered by de-asserting an acok signal. De-asserting the signal provides warning that power is no longer stable and the energy reserves within the PSU's bulk capacitor have dropped to a critical point where initiating a system shutdown may be necessary to preserve the persistent state of the data, marking the beginning of the estimated hold-up time. Stated another way, the notification serves to alert power management subsystem 104 to reserve sufficient energy in the system PSUs to hold-up power rails for long enough to perform a full cache flush of processor caches 110 and memory buffers 112.

In some implementations, the early warning mechanism is associated with a fixed time interval prior to shutdown, in which case power management subsystem 104 may assume system 100 is operating at a maximum load and guarantees a minimum amount of time under maximum load to complete the cache flush and to sequence down the power rails. However, this approach may lead to a conservative implementation where a system shutdown may be initiated earlier than desired, especially where the maximum PSU load is significantly higher than the actual system load during the persistent cache flush. In comparison, a programmable early warning threshold allows the system to trade-off energy consumption prior to the assertion of the warning signal for ride-through against energy consumption after the assertion of the warning signal for hold-up.

After the notification has been triggered, process 200 continues powering the system components in a first operating mode (operation 212). While running in the first operating mode, system components may be powered using the energy in the PSU bulk capacitors. In some embodiments, power may be provided as if AC had not been disrupted. In other embodiments, power saving adjustments may be made within system 100. For example, processor frequency may be throttled, display brightness may be dimmed, and/or other power conserving actions may be taken. Additionally or alternatively, data may continue to be written to and updated in processor caches 110 and memory buffers 112.

Process 200 further monitors the energy level within one or more system PSUs based on the programmed thresholds (operation 214). In some embodiments, system 100 includes sensors to monitor voltage across bulk capacitors in the PSUs. Since the capacitance values of the bulk capacitors are fixed, voltage in the capacitors may be used as a proxy for the PSU energy levels when AC power is disrupted. In other embodiments, the energy level may be computed as a function of the capacitance value of the bulk capacitor and the measured voltage.

Process 200 further determines whether the energy level of the one or more PSUs satisfies a threshold (operation 216). For example, process 200 may determine that the threshold is satisfied if the measured voltage across the one or more bulk capacitors crosses below the voltage threshold programmed at operation 204. If the threshold is not satisfied, then process 200 may continue monitoring the PSU energy levels until power is restored or the voltage in the PSU bulk capacitors reaches or falls below the programmable threshold. Once the threshold is satisfied, a warning signal may be asserted to trigger the cache flush and power down sequence.

In some embodiments, process 200 enters a second operating mode by reducing the system load to minimize power consumption (operation 218). During this phase, power management subsystem 104 may power down components that are not involved in the cache flush operation. For example, power management subsystem 104 may power down peripheral components 124, which may include hard disk drives, fans, displays, peripheral component interconnect express (PCIe) devices, and/or other peripheral hardware. Additionally or alternatively, power management subsystem 104 may throttle clock speed and the frequency of CPU 116 to minimize power consumption.

Process 200 further performs a cache flush (operation 220). During the cache flush operation, CPU 116 may write data stored in processor caches 110 and memory buffers 112 to persistent memory 114, to maintain the persistent state of the data. In some embodiments, process 200 may continue to monitor the PSU energy levels during this operation. If the PSU energy levels fall below a second voltage threshold, then process 200 may trigger the power down sequence even if the cache flush is not complete to prevent all the power rails from dropping off at the same time. The second voltage threshold may be programmed at a much lower level than the first threshold, leaving enough energy to sequentially bring down the power rails.

Once the cache flush is complete, process 200 powers down the remaining system components (operation 224). Process 200 may sequence down the power rails to gracefully shutdown system 100. The sequence in which the power rails are brought down may vary from system to system.

The process depicted in FIG. 2 may maintain a persistent memory state without having to install or otherwise rely on energy from BBUs. Instead, the energy within bulk capacitors of one or more PSUs may be managed by power management subsystem 104 to guarantee persistence. Further, power management subsystem 104 accounts for runtime power load, which allows for variable ride-through and hold-up times to more efficiently and effectively use the stored energy.

3.2 Managing Multiple Power Supply Units

When there are multiple PSUs in a system and AC power is lost to one or more of the PSUs, the amount of energy in a single PSU may not be enough to complete a cache flush operation. However, the aggregate energy across multiple PSUs may be sufficient to complete a cache flush to maintain the persistent state of the data. If there are multiple PSUs, then power management subsystem 104 may monitor the total energy available across all power supplies. Power management system 104 may signal a power failure warning when the aggregate voltage level crosses a threshold to trigger a cache flush operation.

In some embodiments, power management subsystem 104 detects the following events with respect to each PSU being managed:
  The loss of AC power, which may be detected by the de-assertion of an acok signal. If this signal is received from one or more PSUs, then power management subsystem 104 may enter a first operating mode, reducing power during a ride-through window in case AC power is restored.
  An indication that the energy or voltage level in a PSU has crossed a first threshold, which may be detected by the assertion of a vwarn signal. Power management subsystem 104 may combine the voltage warning information from all PSUs to determine when to enter a second operating mode whereby persistent cache flush handler 106 initiates a cache flush operation. Power management system 104 may further reduce power as previously described during the second operating mode.
  An indication that the energy or voltage level in a PSU has crossed a second threshold, which may be detected by the assertion of a pwrok signal. Power management subsystem 104 may combine the pwrok signal information to determine whether to immediately power down the system. The shutdown may be triggered if a further drop in PSU energy levels would not leave sufficient energy to safely sequence the power the rails down.

In some embodiments, power management subsystem 104 maintains a set of per-PSU counters to track estimated energy levels in each PSU in the event of an AC power loss. The initial value of the per-PSU counters may be hard-coded or programmable to correspond to the amount of energy available in the PSU when vwarn asserts. When power management subsystem 104 detects that a PSU has asserted vwarn, it may start decrementing the associated PSU's energy counter at a rate proportional to the number of active supplies in the system and the maximum load per supply. For example, if there is a single active PSU and the maximum load is 1200 Watts (W), then the counter may be decremented at a rate of 1.2 Joules (J) per millisecond. If there are two active supplies, the load is 600 W per supply, and the energy counter may be decremented by 600 mJ/ms. With four active supplies, the energy counter may be decremented at 300 mJ/ms. As another example, if the worst case system load is reduced to 1000 W, then the counter decrement rate may be modified to 1J/ms for a single supply, 500 mJ/ms for two supplies, and 250 mJ/ms for four supplies. The counters may be tuned to provide maximum ride-through time while maintaining sufficient energy to maintain the persistent cache flush for prolonged outages.

Figure 3:
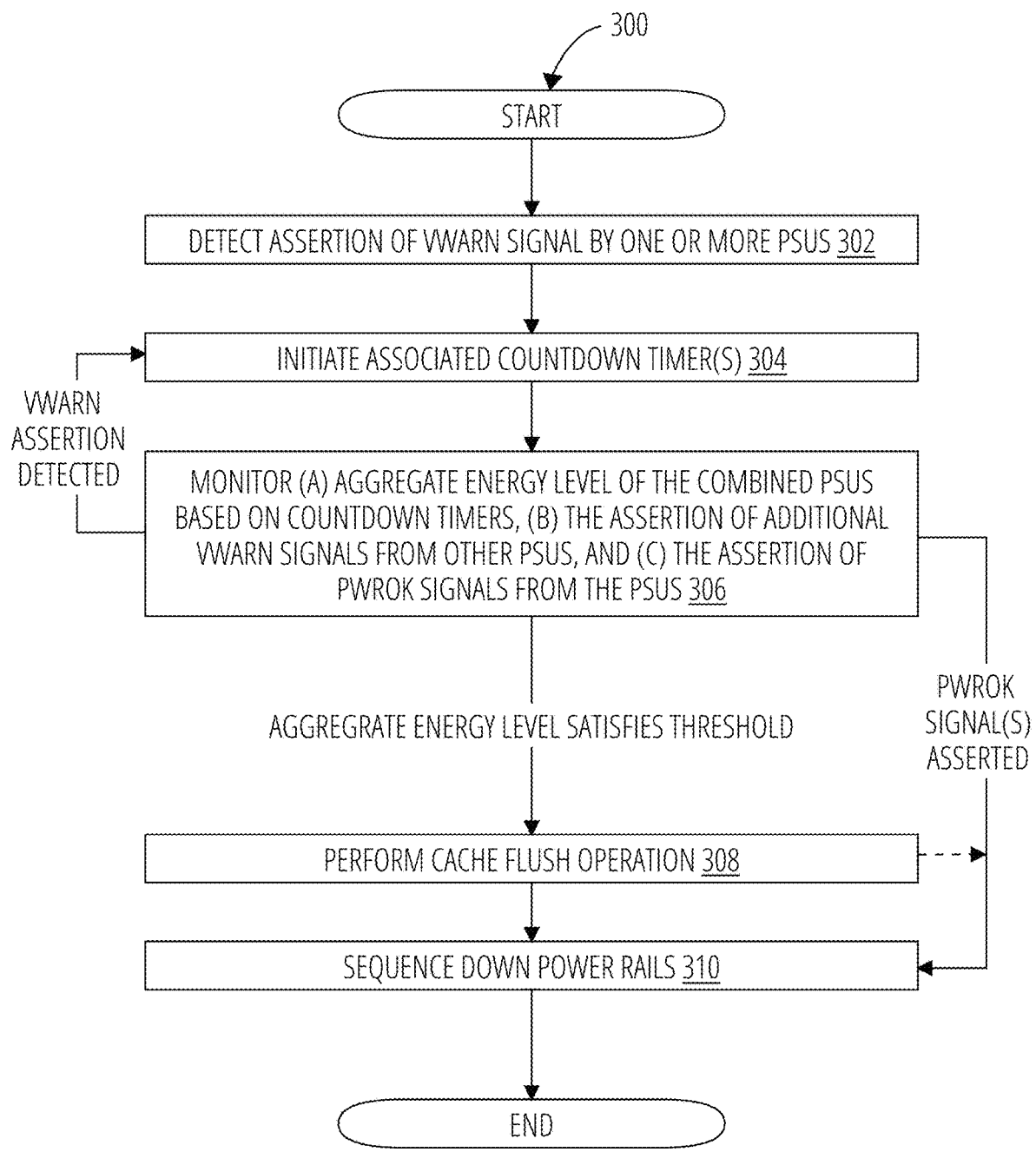
FIG. 3 illustrates an example set of operations for managing persistent cache flush operations in systems with multiple power supplies accordance with some embodiments.

FIG. 3 illustrates an example set of operations for managing persistent cache flush operations in systems with multiple power supplies accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

Referring to FIG. 3, process 300 detects the assertion of one or more vwarn signals from one or more PSUs (operation 302). As previously noted, each PSU may be configured to assert the signal when AC power is lost and the energy in the PSUs bulk capacitor(s) falls below a threshold, which may be programmable.

Responsive to detecting the vwarn signal(s), process 300 initiates one or more associated countdown timers (operation 304). In some embodiments, the countdown timers track the estimated energy levels for each PSU that has asserted the vwarn signal. Process 300 may decrement the counter at a rate proportional to the number of PSUs in the system and the maximum load per supply. In other embodiments, other mechanisms may be used to track the energy levels within the PSUs. For instance, process 300 may increment a counter rather than decrement a counter until a threshold is reached or use other tracking logic.

Additionally or alternatively, process 300 may cause system 100 to enter a reduced power mode responsive to detecting one or more vwarn signals. The reduced power operating mode may be triggered by a single signal or a threshold number of signals, depending on the particular implementation. In other embodiments, process 300 may gradually reduce power with each new detected signal. For example, process 300 may increasingly throttle the CPU frequency with each new vwarn signal and/or initiate or increase other power conserving actions as previously described.

Process 300 further monitors (a) the aggregate energy level of the combined PSUs based on the countdown timers (or other tracking logic), (b) the assertion of additional vwarn signals from other PSUs, and (c) the assertion of pwrok signals from the PSUs (operation 306). If additional vwarn signals are detected, then process 300 initiates the associated countdown timers for the PSU(s) that asserted the signals (operation 304).

If the aggregate energy level satisfies a first threshold, then process 300 performs a cache flush operation (operation 308). For example, process 300 may determine that the aggregate energy level across all PSUs equals or falls below a minimum threshold. During the cache flush operation, CPU 116 may write data stored in processor caches 110 and memory buffers 112 to persistent memory 114, to maintain the persistent state of the data. In some embodiments, process 300 may continue to monitor the PSU energy levels during this operation.

If the cache flush operation completes, or the PSUs fall below a second voltage threshold number triggering one or more pwrok signals, then process 300 sequences down the power rails (operation 310). When a pwrok signal is detected, process 300 may initiate the power down sequence even if the cache flush is not complete to prevent all the power rails from dropping off at the same time. The second voltage threshold may be programmed at a much lower level than the first threshold, leaving enough energy to sequentially bring down the power rails.

Figure 4:
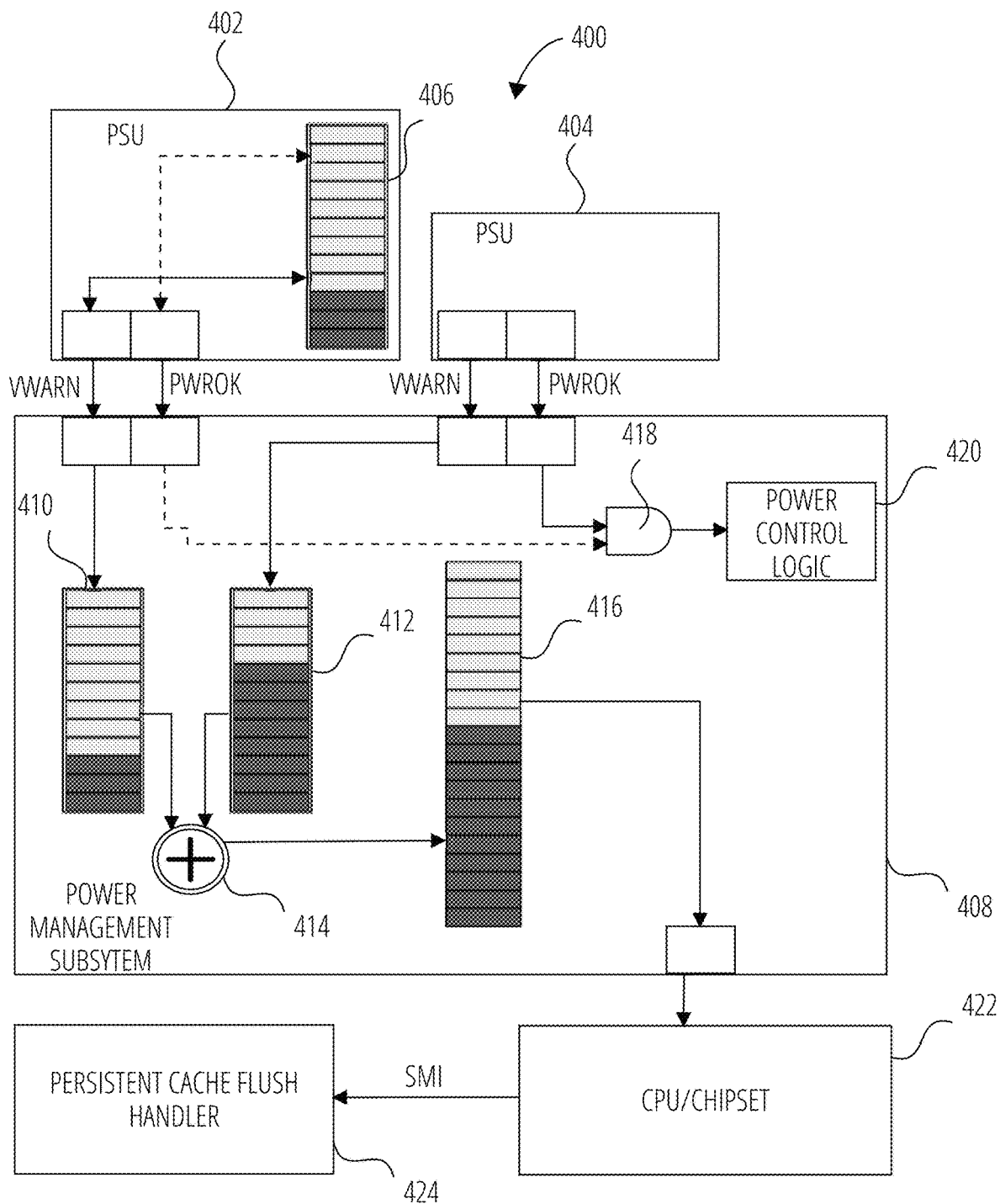
FIG. 4 illustrates an example system for managing multiple power supplies in accordance with some embodiments.

FIG. 4 illustrates example system 400 for managing multiple power supplies in accordance with some embodiments. System 400 includes PSUs 402 and 404. However, the number of PSUs may vary depending on the particular implementation. Each PSU may include one or more bulk capacitors, such as capacitor 406, which stores electrostatic energy obtained from a connected AC power network. The capacitor-based storage allows PSUs to be implemented with a smaller footprint than BBUs and provides faster charge and discharge rates. PSUs 402 and 404 may be connected to the same AC power network or different AC power networks depending on the particular implementation. If connected to different AC power networks, then one PSU may lose AC power while another PSU continues to be supplied with power by a different AC network. In this scenario, each PSUs may provide separate acok signals (not shown) to power management subsystem 408. These signals may be independently de-asserted by the individual PSUs when AC power is lost to signal which PSU lost power. In other cases, the de-assertion of an acok signal may signal that a group or all of the PSUs have lost AC power.

In some embodiments, each PSU asserts a vwarn signal when the energy in the bulk capacitor (e.g., bulk capacitor 406) reaches a threshold. Thus, a vwarn signal notifies the power management subsystem 408 that the available energy of the associated PSU is at a first threshold level. Power management subsystem 408 maintains separate energy counters for each PSU, which are triggered when the associated PSU asserts the vwarn signal. For example, when PSU 402 asserts a vwarn signal, then power management subsystem 408 may decrement energy counter 410 at a rate proportional to the number of PSUs in the system and the maximum load per supply. Energy counter 412 is managed independently of energy counter 410 (the vwarn signals from PSUs do not trigger the count on unassociated counters for other PSUs) and is decremented responsive to PSU 404 asserting a vwarn signal. Power management subsystem 408 includes adder 414, which sums together the estimated energy counts for the PSUs to compute aggregate energy counter 416.

In some embodiments, power management subsystem monitors aggregate energy counter 416 to determine whether the aggregate energy across all PSUs has reached or fallen below a system threshold, which may be programmable and vary depending on the particular implementation. If the threshold is reached, then power management subsystem 408 asserts an SMI signal to halt the current task being executed by CPU/chipset 422 in preparation for a persistent cache flush and reset. Responsive to the SMI, persistent cache flush handler 424 may initiate the persistent cache flush operations described previously.

Figure 5:
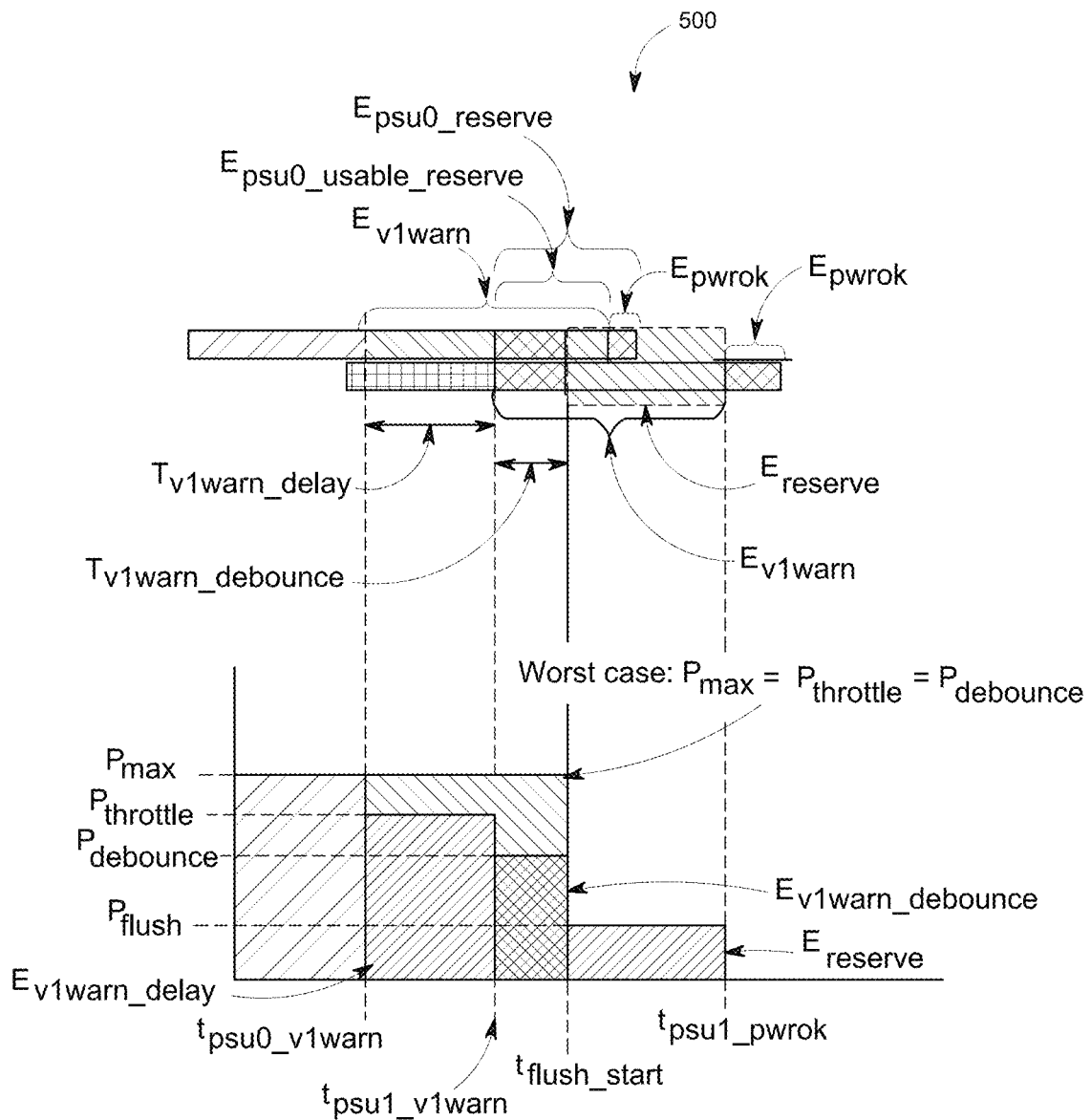
FIG. 5 illustrates an example timing diagram with staggered warning signals from different power supply units in accordance with some embodiments.

FIG. 5 illustrates example timing diagram 500 with staggered warning signals from different power supply units in accordance with some embodiments. The top half of diagram 500 depicts the timing of the power failures while the bottom half of diagram 500 depicts the potential power reductions system 100 may implement in response to the impending power failure. Diagram 500 assumes worst case behavior, where the system operates at maximum load until the power-fail cache flush is triggered. When the power fail cache flush is triggered, system power consumption is reduced to minimize load when completing the flush operation.

The variables of diagram 500 may be defined as follows:

$t_{psu0\_v1warn}$—the time at which a first PSU asserts v1warn $t_{psu1\_v1warn}$—the time at which a second PSU asserts v1warn $t_{flush\_start}$—the time at which power management subsystem 104 initiates a power fail flush operation $t_{psu1\_pwrok}$—the time at which the second PSU de-asserts pwrok and system 100 begins the power down sequence $T_{v1warn\_delay}$—the time delay between $t_{psu0\_v1warn}$ and $t_{psu1\_v1warn}$ $T_{v1warn\_debounce}$—the time delay between $t_{psu1\_v1warn}$ until $t_{flush\_start}$ $T_{v1warn}$—time to utilize all of $E_{v1warn}$ energy in the supply when under maximum load $P_{max}$—the maximum system load $P_{throttle}$—the system load after first PSU has asserted v1warn $P_{debounce}$—the system load after all PSUs have asserted v1warn $P_{flush}$—the system load when after power fail flush operation is triggered $E_{v1warn}$—the usable energy available in a PSU after v1warn assertion, but prior to pwrok de-assertion $E_{pwrok}$—the usable energy available in the PSU after pwrok de-assertion and prior to the loss of the primary power rail $E_{psu0\_reserve}$—the usable energy remaining in first PSU to assert v1warn after second PSU asserts v1warn at $t_{psu1\_v1warn}$ $E_{reserve}$—the total usable energy remaining in all PSUs after v1warn has asserted on all PSUs, but prior to the de-assertion of pwrok on the last PSU.

$E_{v1warn\_delay}$—the energy that system 100 consumes during $t_{v1warn\_delay}$ $E_{flush}$—the energy required to successfully complete a power fail flush operation N—the number of active PSUs providing power to the system Referring to FIG. 5, when the first PSU asserts v1warn, at $t_{psu0\_v1warn}$, that PSU has ($E_{v1warn}+E_{pwrok}$) energy available before the supply shuts off the associated power rail and stops providing power to the system. There are N active PSUs and system load is split amongst all the active PSUs in the system. Some point later in time the second PSU asserts v1warn at $t_{psu1\_v1warn}$. The amount of energy consumed during the period of time between $t_{psu0\_v1warn}$ and $t_{psu1\_v1warn}$ is represented as $E_{v1warn\_delay}$.

During the period of time after the first supply has asserted v1warn but prior to the point where the second supply has asserted v1warn, system 100 is drawing energy from all the N active PSUs. The maximum energy consumed from the first PSU after it asserts v1warn is (($E_{v1warn}$+ $E_{pwrok}$). The energy remaining in the first PSU when the second CPU asserts v1warn is represented as $E_{psu0reserve}$.

If $T_{v1warn\_delay}$ is small, then the second PSU de-asserts pwrok before the system has consumed all the energy from the first supply. In the worst case, when both supplies each assert v1warn simultaneously, both supplies also de-assert pwrok simultaneously. Under these circumstances, it may not be possible to use any of the $E_{pwrok}$ energy in the first supply if the system is shutdown when all supplies de-assert pwrok. To allow for this possibility, system 100 may be configured with the assumption that the $E_{pwrok}$ energy is not available in the first supply.

To utilize all the energy in both supplies, system 100 may be configured such that the power down flush is not immediately started when the second PSU asserts v1warn. System 100 may instead delay the flush trigger until the amount of energy reserved in all the active PSUs is equal to the amount required to complete the flush. System 100 may further be configured to guarantee that $E_{reserve} \geq E_{flush}$ to reserve sufficient energy to complete the cache flush operation.

If both PSUs assert v1warn simultaneously, then $T_{v1warn\_delay}$=0, and $T_{v1warn\_debounce}$=$T_{v1warn}$. If the PSUs assert v1warn far apart in time, then $T_{v1warn\_debounce}$=0, and the power fail flush may be triggered as soon as the second PSU asserts v1warn. Power management subsystem 104 may program the energy/voltage thresholds accordingly.

4. Managing Externally Initiated Asynchronous Reset Events

Power disruption events are not the only cause of system shutdowns or resets. In some cases, system errors or user actions may trigger a system shutdown or reset. For these externally-initiated asynchronous events, monitoring for power loss may not be sufficient to maintain the persistent memory state since A/C power may be relatively constant. Asynchronous hardware resets are typically implemented by directly asserting a reset request pin, which initiates a reset in HW and may not provide any ability to invoke a software cache flush handler prior to the reset. In some embodiments, to prevent data loss, board logic is configured to generate an SMI signal to initiate a cache flush when an externally initiated reset request is detected.

Figure 6:
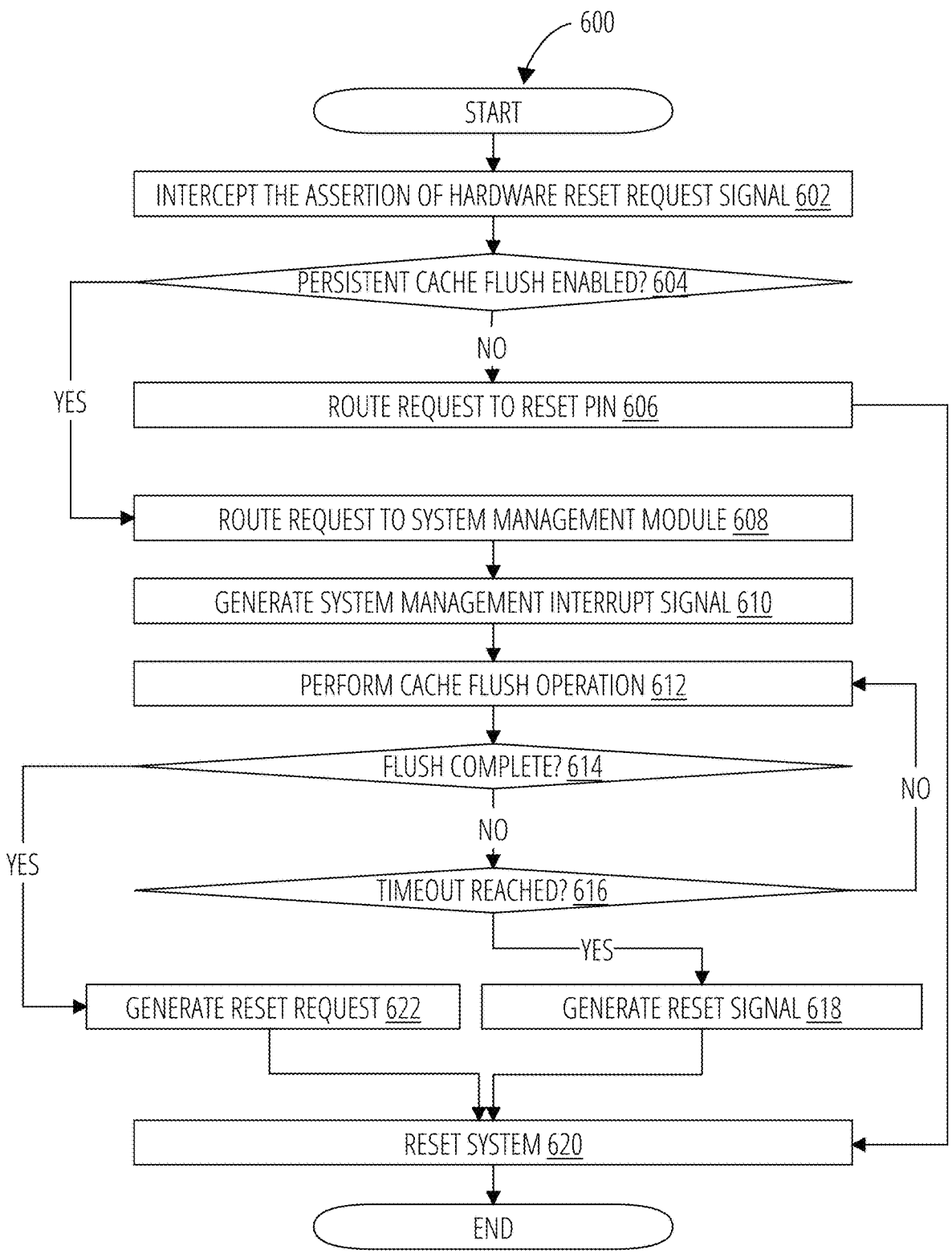
FIG. 6 illustrates an example set of operations for processing externally initiated asynchronous reset events in accordance with some embodiments.

FIG. 6 illustrates an example set of operations for processing externally initiated asynchronous reset events in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

Referring to FIG. 6, process 600 intercepts the assertion of a HW reset request signal (operation 602). In some embodiments, platform-initiated reset requests, including those initiated by system management module 118, are proxied through power management subsystem 104. This allows system 100 to run persistent cache flush handler 106 prior to performing the requested reset or power-transition action.

In some embodiments, process 600 determines whether persistent cache flushing is enabled (operation 604). As described further below, system firmware (or other system logic) may selectively enable or disable persistent cache flushing to configure whether data in processor caches 110 are included in the persistent memory state.

If persistent cache flushing is not enabled, then process 600 routes the request to the reset pin (operation 606). In some embodiments, power management subsystem 104 routes the request to a system chipset. The chipset may initiate a HW reset sequence.

If persistent cache flushing is enabled, then process 600 routes the request to system management module 118 (operation 608). In this case, the reset pin is not immediately asserted responsive to the platform or user-initiated reset to allow time to invoke the software-based cache flush handler.

In some embodiments, process 600 generates an SMI signal to place system 100 into a system management mode (operation 610). The SMI signal may be asserted by system management module 118, which may use a special signaling line directly tied to CPU 116. The signal may cause system firmware 120 (e.g., BIOS) to halt the current task being executed by CPU 116 in preparation for the cache flush and reset.

In some embodiments, if persistent cache flushing is enabled, then system firmware 120 (e.g., BIOS) configures a general-purpose input/output (GPIO) pin within system management module 118 as a trigger for an SMI. The GPIO pin may be used to signal system firmware 120 when a cache flush followed by a warm reset is to be performed. This GPIO may be different from the GPIO used to signal an impending power-failure to the chipset to communicate that the persistent cache flush handler should terminate with the request warm-reset rather than a power-off.

Process 600 next performs a cache flush operation (operation 612). Responsive to the SMI signal, system firmware 120 may invoke cache flush handler 106 to manage a cache flush operation as previously described. Thus, data is transferred from volatile memory, such as processor caches 110 and memory buffers 112, to persistent memory 114, thereby maintaining the persistent state.

Process 600 further determines whether the flush is complete (operation 614). Persistent cache flush handler 106 may assert a signal or otherwise provide a notification when the data in processor caches 110 and memory buffers 112 have been written to persistent memory 114.

Once the cache flush completes, process 600 generates a reset request (operation 622). For example, persistent cache flush handler 106 may initiate a system reset by writing a particular value to a specific IO port/register of a PCH (e.g., 0x06 to port CF9) or by requesting that system logic assert the HW reset request signal to the chipset.

If the flush is not complete, process 600 may determine whether a timeout has been reached (operation 616). For example, process 600 may allow one second or another threshold period of time, which may be configurable by system 100, for the flush operation to complete. In some cases, a system state associated with the reset event may prevent a flush from completing. Implementing a timeout may prevent system 100 from entering a state in which a warm reset cannot be executed.

If the timeout is reached, process 600 generates a reset request signal directly to the chipset (operation 618). The reset request in operation 622 may also be a direct reset request to the chipset or may be a software-based request. Thus, the mechanisms for resetting the system may differ based on whether the flush successfully completes or not.

Responsive to the reset signal, system 100 is then reset (operation 420). A reset in this context may cause system 100 to shutdown or restart.

Figure 7:
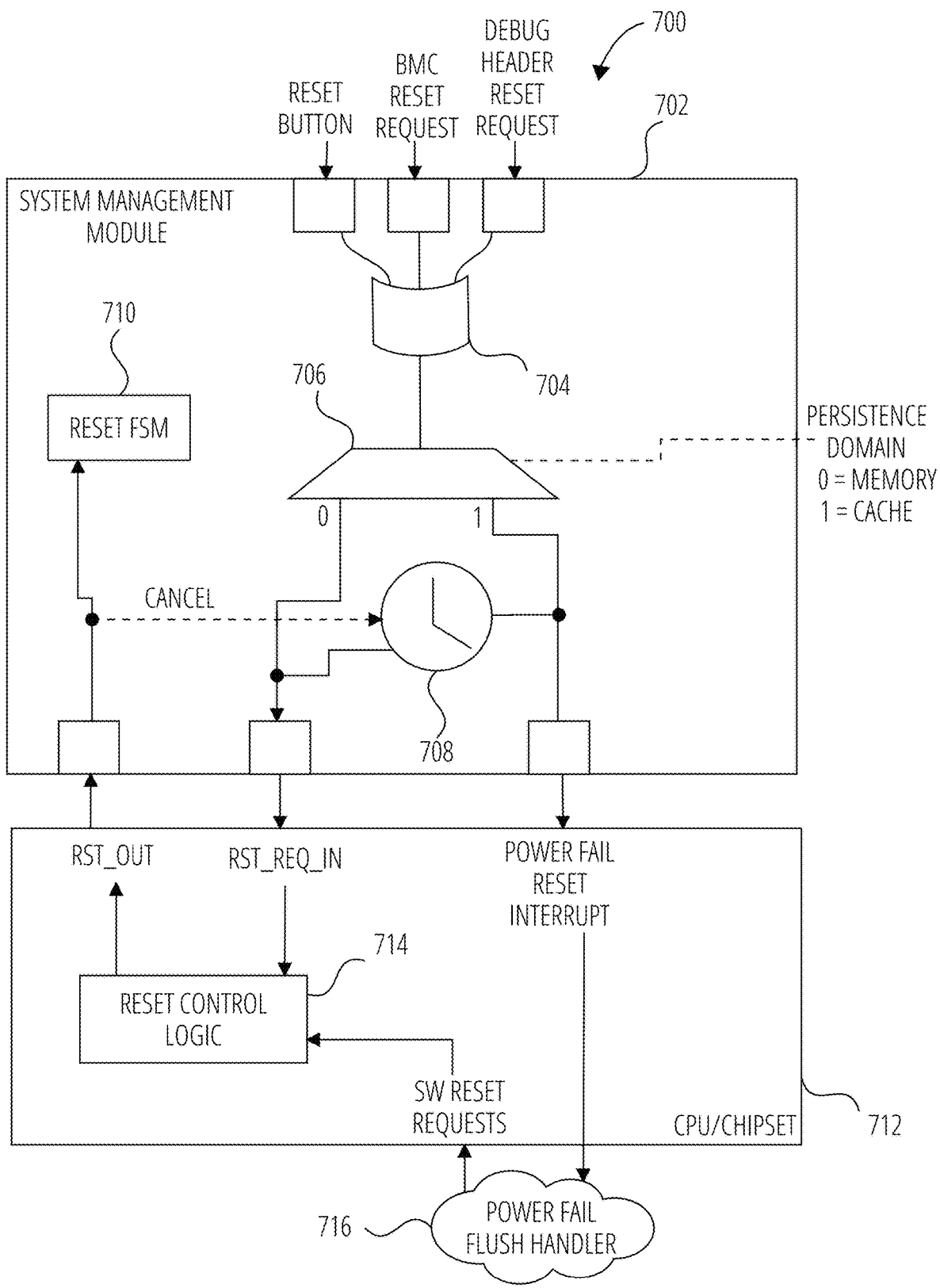
FIG. 7 illustrates an example system for intercepting and processing externally initiated asynchronous reset events in accordance with some embodiments.

FIG. 7 illustrates example system 700 for intercepting and processing externally initiated asynchronous reset events in accordance with some embodiments. System 700 includes system management module 702, which may be implemented in programmable hardware, such as a field programmable gate array (FPGA), or through other hardware components (or combination or hardware and software) as described further below. System management module 702 acts a proxy, intercepting the assertion of hardware request signals, which may be triggered by a user pressing a reset button or a reset request asserted by a board management controller (BMC) or a debug header.

System management module 702 includes logic gate 704, which routes the asserted reset request signal to demultiplexer 706. The select wire coupled to demultiplexer 706 is set based on whether persistent cache flushing is enabled or disabled. A "0" or low voltage state represents a memory operation mode where persistent cache flushing is disabled and data in processor caches 110 and memory buffers 112 are not managed as part of the persistence domain. A "1" or high voltage state represents a persistent cache operation mode where persistent cache flushing is enabled and data in processor caches 110 and memory buffers 112 are part of the persistent domain. However, the values on the select wire may be swapped, depending on the particular implementation.

When persistent cache flushing is disabled, then system management module 702 asserts a request reset interrupt signal to a pin that is electrically coupled on CPU/chipset 712. In response, reset control logic 714 on CPU/chipset 712 halts the current task being executed and initiates a hardware reset, which may comprise sending a signal to reset finite state machine (FSM) 710. Reset FSM 710 may sequence down the power rails in a particular order to avoid damaging hardware components. As previously noted, the sequence in which power rails are brought down may vary depending on the system architecture.

When persistent cache flushing is enabled, system management module 702 asserts an SMI using a special signaling line directly tied to another pin on CPU/chipset 712. The signaling line is distinct from the line used to perform the HW reset previously described when persistent cache flushing is not enabled. In response to detecting the SMI, CPU/chipset 712 sends a software-based request to power fail flush handler 716 to initiate a persistent cache flush.

Responsive to the request, persistent cache flush handler 716 initiates the persistent cache flush operations to transfer data from processor caches and memory buffers to persistent storage media. If the cache flush successfully completes, then power fail flush handler 716 sends a software reset request to reset control logic 714, which may trigger the power down sequence as previously described.

When persistent cache flushing is enabled, system management module 702 further initializes timer 708. Timer 708 may decrement or increment until canceled or a timeout value is reached. The count may be canceled responsive to detecting the assertion of a signal on the input pin to reset FSM 710. The signal indicates that power fail flush handler 716 successfully flushed the processor caches and memory buffers to persistent storage media, and the reset sequence has been initiated. If the timeout value is reached before the timer is canceled, then system management module 702 may directly assert the rst_req_in pin on CPU/chipset 712 to trigger a HW reset.

5. Coordinating Persistent Cache Flushing State Between System Components

System boot firmware may expose persistent cache flushing support via a user configurable option. However, the boot firmware may be deployed across a wide variety of hardware platforms and presenting the option may not imply that a specific platform hardware is capable of supporting persistent cache flushing. Whether or not the platform is capable of supporting persistent cache flushing may depend on the hardware configuration, the presence and/or health of energy storage modules and capabilities of the underlying hardware components. In some embodiments, components of system 100 engage in a handshake to (a) determine whether the hardware has sufficient capability to support persistent cache flushing; (b) selectively enable/disable persistent cache flushing; (c) configure system components to support persistent cache flushing when persistent cache flushing is enabled; and (d) communicate to the operating system whether persistent cache flushing has been successfully enabled.

Figure 8:
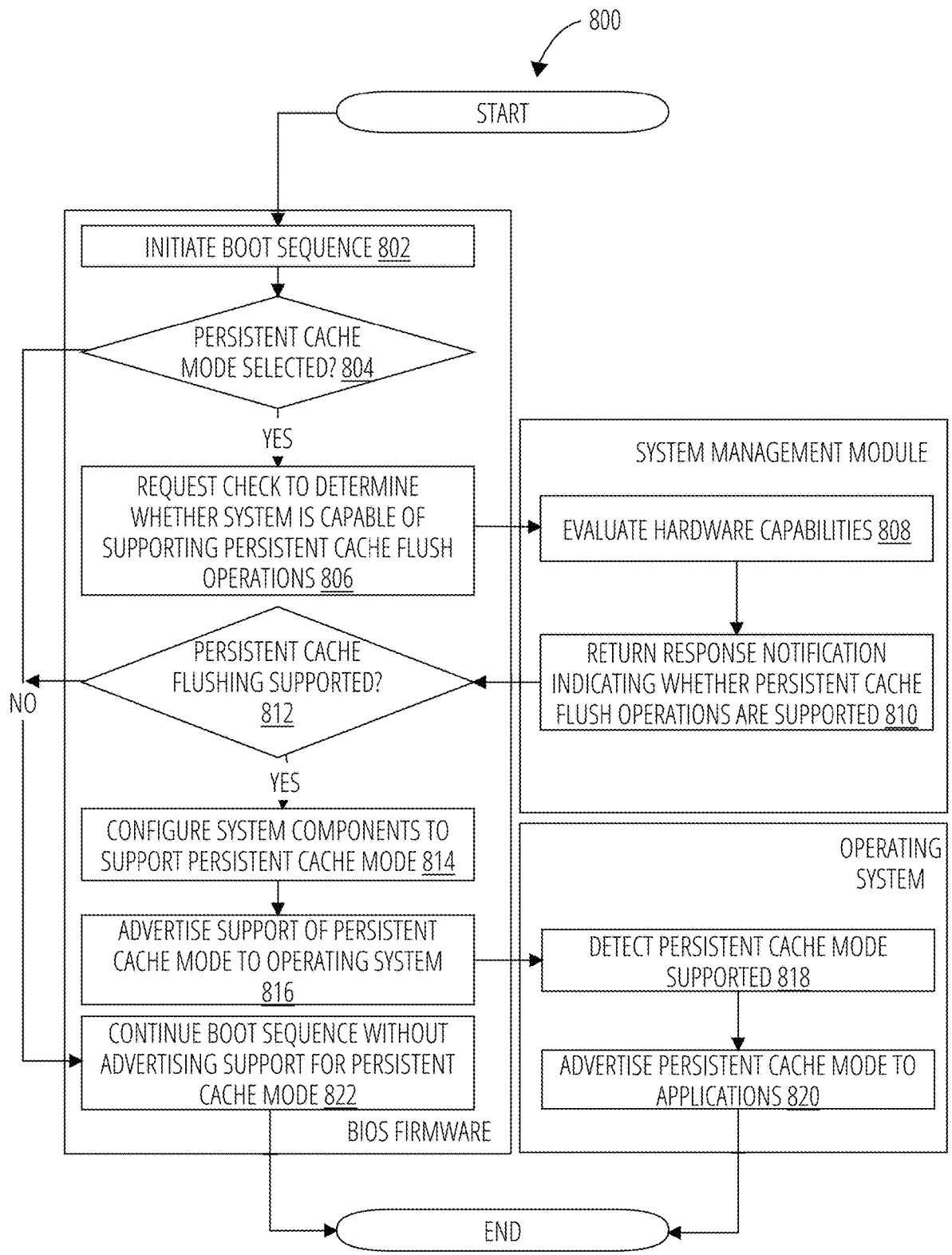
FIG. 8 illustrates an example set of operations for coordinating persistent memory operating modes in accordance with some embodiments.

FIG. 8 illustrates an example set of operations for coordinating persistent memory operating modes in accordance with some embodiments. One or more operations illustrated in FIG. 8 may be modified, rearranged, or omitted all together. Accordingly, the particular sequence of operations illustrated in FIG. 8 should not be construed as limiting the scope of one or more embodiments.

Referring to FIG. 8, process 800 initiates a boot sequence (operation 802). In some embodiments, the boot sequence loads system firmware 120, which may include BIOS firmware. The firmware may be configured to expose a user-configurable option for persistent cache flushing. For example, the firmware may present a prompt a user whether the user would like to enable persistent cache flushing, or the user may navigate user interface, such as a BIOS setup utility screen.

In some embodiments, the user interface exposes multiple settings for a "Durability Domain" setup option to configure whether a platform will operate in ADR mode or persistent cache flush mode. For example, the user interface may expose an option to select a "Memory Controller" setting or a "CPU Cache Hierarchy" setting. In the "Memory Controller" setting, ADR is enabled but persistent cache flushing is disabled. When this setting is selected, memory buffers 112 are flushed during power outage events, but the flush operation is not applied to processor caches 110. In some embodiments, system hardware may be configured in this setting by default.

In the "CPU Cache Hierarchy" setting, persistent cache flushing is enabled. Thus, if this option is selected, then data in memory buffers 112 and processor caches 110 are flushed upon power outage events if the platform-hardware supports persistent cache flush operation.

Additionally or alternatively, other settings may be supported. For example, a "Standard Domain" setting may be selected where cached data is not flushed upon power failure events. Users may select the preferred setting via a user interface, as previously described. If a user has not selected a setting, then system firmware 120 may select a default setting, which may vary depending on the particular implementation.

In some embodiments, system firmware 120 checks to determine whether persistent cache mode has been selected by the user or default (operation 804). Even if the option is selected, the platform hardware may not support persistent cache flush operations in some cases. Further, system hardware may evolve over time as components are added, removed, age, and/or fail.

If persistent cache mode has not been selected, then system firmware 120 continues the boot sequence without advertising support for persistent cache mode (operation 822). The boot sequence may include initializing hardware components, loading the operating system, and/or processing system boot files that have not already been processed. The boot sequence may continue without performing the hardware capability checks described further below.

If persistent cache mode has been selected, then system firmware 120 sends a request to system management module 118 to determine whether system 100 is capable of supporting persistent cache flushing operations (operation 806).

Responsive to the request, system management module 118 evaluates the hardware capabilities of system 100 (operation 808). In some embodiments, system management module 118 may engage in a handshake with one or more hardware components to determine settings, configurations, and/or other information indicative of whether persistent cache flushing is supported. For example, during the boot sequence, the connected hardware components may include firmware that provides a list of features supported by the component to the system firmware. System management module 118 may scan the feature list and/or other information provided to determine if the features are compatible with persistent cache flushing.

In some embodiments, evaluating the hardware capabilities of system 100 comprises determining whether PSU 102*a* and/or PSU 102*b* support generating the pre-warning signal and configuring a programmable vwarn threshold. For example, system management module 118 may determine whether PSU 402 includes a pin for asserting the vwarn signal. If the PSUs do not have these capabilities, then system management module 118 may determine that the platform-hardware does not support persistent cache flush operations.

Additionally or alternatively, system management module 118 may determine whether power management subsystem 104 includes logic for detecting the vwarn signals, monitoring aggregate energy levels across multiple PSUs, and/or triggering interrupts when a systemwide energy level is below a threshold. If power management subsystem 104 does not have these capabilities, then system management module 118 may determine that the platform-hardware does not support persistent cache flush operations.

Additionally or alternatively, system management module 118 may evaluate other hardware capabilities. For example, system management module 118 may evaluate system 100 to determine whether the system supports intercepting reset signals and configuring a GPIO pin to process asynchronous reset events. As another example, system management module 118 may evaluate CPU 116 to determine whether it includes a special signaling line for invoking a persistent cache flush handler.

Additionally or alternatively, system management module 118 may determine whether any BBUs have been installed that support persistent cache flush operations. If BBUs have been installed, then system management module 118 may determine that persistent cache flushing is supported even if the PSU architecture does not provide support. On the other hand, system management module 118 may determine that persistent cache flushing is not supported if BBUs are not installed and the PSUs and/or power management subsystem do not support persistent cache flush operations.

Additional or alternatively, system management module 118 may evaluate other hardware capabilities. For example, system management module 118 may evaluate the capacity of the auxiliary energy storage devices installed in the platform, such as BBUs, and determine whether the devices provide sufficient energy to power the system components that are active during the flush process. Additionally or alternatively, system management module 118 may evaluate the health of a battery, such as by measuring the battery impedance, to determine whether the platform hardware supports persistent cache flushing.

Based on the evaluation, system management module 118 returns a response to system firmware 120 indicating whether the platform is capable of supporting persistent cache flushing or not (operation 810). The response may grant system firmware 120 permission to enable persistent cache flushing if supported. Otherwise, system management module 118 denies system firmware 120 the ability to enable persistent cache flushing.

Upon receiving the response, system firmware 120 determines whether system 100 supports persistent cache flushing (operation 812).

If the platform hardware does not support persistent cache flushing, then system firmware 120 continues the boot sequence without advertising support for persistent cache flushing to operating system 122 (operation 822). When persistent cache flushing is not advertised and enabled, operating system 122 may prevent applications from attempting to treat processor caches as persistent in system 100.

If persistent cache flushing is supported, system firmware 120 and/or system management module 118 then configure system components to support persistent cache flushing operations (operation 814). For example, system firmware 120 may establish the GPIO pins, initialize the per-PSU timers, configure the PSUs, and otherwise configure system hardware/software to perform cache flush operations as previously described.

System firmware 120 and/or system management module 118 then advertises support for persistent cache flushing to the operating system 122 (operation 816). In some embodiments, system firmware 120 may provide a list of supported features and/or configuration settings to operating system 122. The list may include an entry indicating that persistent cache flushing is supported and enabled. However, the manner in which support is advertised may vary depending on the particular implementation.

Based on the advertisement, operating system 122 detects persistent cache mode is supported (operation 818). For example, operating system 122 may scan a list of supported features during the boot sequence to determine whether system firmware or system management module 118 is advertising support for persistent cache flushing.

If persistent cache mode is enabled and supported by the platform hardware, then operating system 122 advertises the persistent cache mode to one or more applications (operation 820). In some embodiments, the applications may query operating system 122 to determine whether persistent cache mode is available and supported. Operating system 122 may provide a response to indicating whether or not the applications may rely on persistent caching. An application may implement different logic depending on whether persistent caching is enabled and supported or not. For instance, if enabled, a database application may treat reads and writes as committed without implementing complicated software-based checks, which may simplify the application code and provide more efficient execution of reads and writes.

As system components evolve, process 800 may be repeated to determine whether the support for persistent cache mode has changed. A change in hardware, such as the installation of a BBU or PSU upgrade, may lead system 100 to advertise support for persistent cache flushing when it was previously not supported. In other cases, the advertisement may be removed if components, such as a BBU, are removed or fail.

6. Hardware Implementations

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
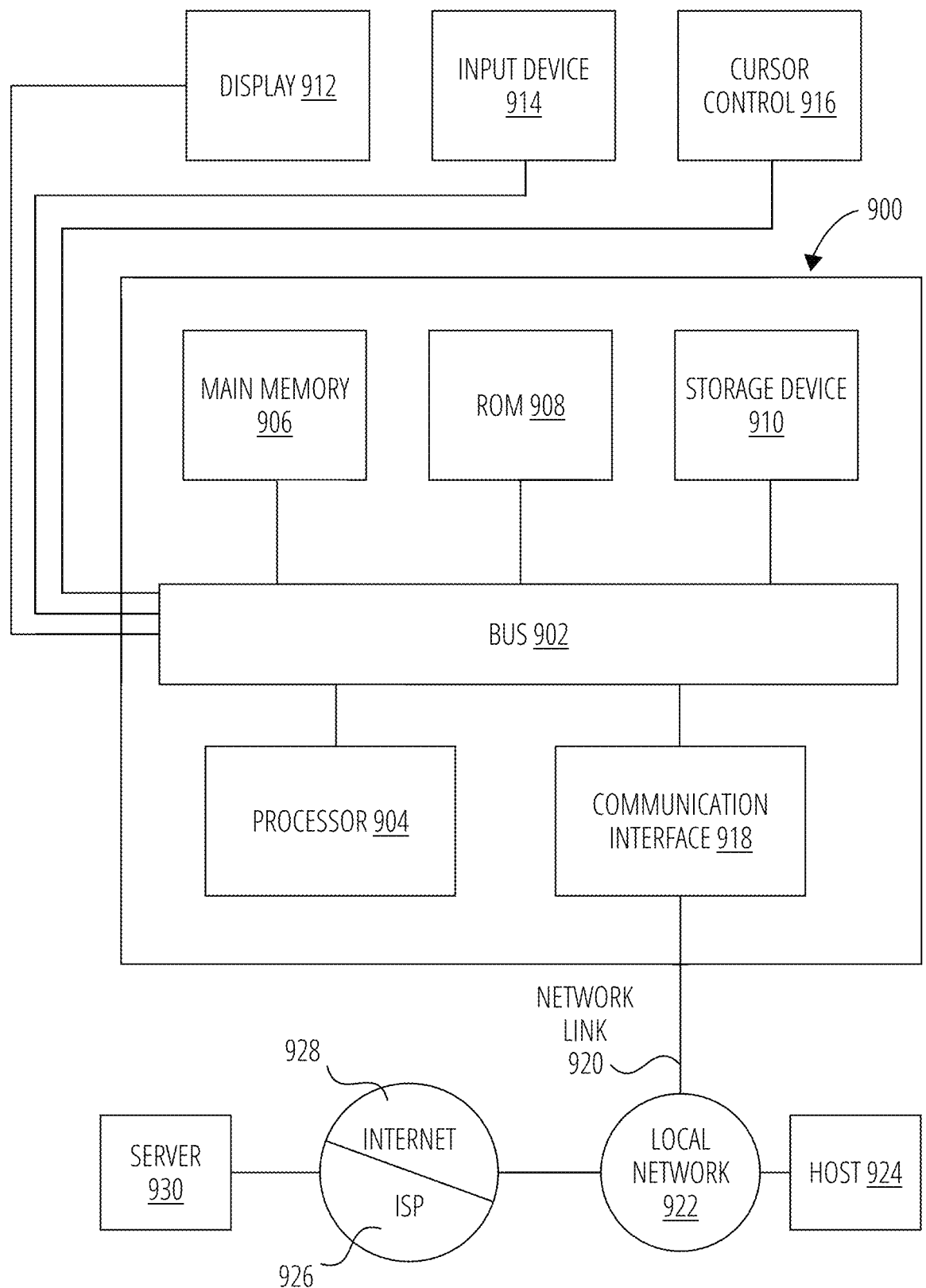
FIG. 9 shows a block diagram that illustrates a computer system in accordance with some embodiments.

For example, FIG. 9 is a block diagram that illustrates computer system 900 upon which an embodiment of the invention may be implemented. Computer system 900 includes bus 902 or other communication mechanism for communicating information, and a hardware processor 904 coupled with bus 902 for processing information. Hardware processor 904 may be, for example, a general-purpose microprocessor.

Computer system 900 also includes main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes read only memory (ROM) 908 or other static storage device coupled to bus 902 for storing static information and instructions for processor 904. Storage device 910, such as a magnetic disk or optical disk, is provided and coupled to bus 902 for storing information and instructions.

Computer system 900 may be coupled via bus 902 to display 912, such as a cathode ray tube (CRT) or light emitting diode (LED) monitor, for displaying information to a computer user. Input device 914, which may include alphanumeric and other keys, is coupled to bus 902 for communicating information and command selections to processor 904. Another type of user input device is cursor control 916, such as a mouse, a trackball, touchscreen, or cursor direction keys for communicating direction information and command selections to processor 904 and for controlling cursor movement on display 912. Input device 914 typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 900 can receive the data on the network line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a set of data in volatile memory of a computing system, wherein the set of data is part of a persistent memory state but is not stored in nonvolatile storage;
   determining that an input power in a set of one or more power supply units has been lost;
   responsive to determining that input power in the set of one or more power supply units has been lost, running the computing system in a first operating mode, wherein the set of data is not flushed to persistent storage in the first operating mode;
   determining that available energy in the set of one or more power supplies has dropped to a threshold, wherein the threshold is a systemwide energy threshold that is programmed based upon an amount of energy used to complete a cache flush operation;
   responsive to determining that the available energy in the set of one or more power supplies has dropped to the threshold, performing a cache flush that transfers the set of data to persistent memory in the computing device to maintain the persistent memory state.

2. The method of claim 1, wherein determining that the available energy in the one or more power supply units drops below the threshold comprises determining that a voltage across at least one bulk capacitor in the one or more power supply units has fallen below a threshold voltage.

3. The method of claim 1, further comprising estimating an amount of energy available within a power supply using a counter that begins decrementing when a power supply unit signals that an energy threshold has been crossed, wherein the counter is decremented at a rate proportional to a worst case estimated load on that power supply.

4. The method of claim 1, further comprising estimating a total amount of energy available within a plurality of power supplies by summing a set of energy counters maintained for the plurality of power supplies.

5. The method of claim 1, wherein determining the available energy in the set of one or more power supplies has dropped to a threshold comprises comparing a sum of a plurality of counters to a minimum energy threshold value, wherein the plurality of counters include at least one counter for each power supply unit of the one or more power supply units, wherein the threshold is satisfied when the sum of the plurality of counters is less than or equal to the minimum energy threshold value.

6. The method of claim 1, wherein responsive to determining that the available energy in the set of one or more power supplies has dropped to the threshold, one or more hardware components that are not involved in performing the cache flush are powered down.

7. The method of claim 1, wherein responsive to determining that the available energy in the set of one or more power supplies has dropped to the threshold, processor frequency is reduced in the computing system.

8. The method of claim 1, further comprising de-asserting a first signal responsive to determining that the input power has been lost and asserting a second signal responsive to determining that the available energy in the set of one or more power supplies has dropped to the threshold.

9. A system comprising:
   one or more power supply units;
   a memory subsystem including volatile memory and persistent memory, wherein the volatile memory stores a set of data that is part of a persistent memory state and is not stored in the persistent memory; and
   system logic coupled to the one or more power supply units that:
      determines that an input power has been lost in the one or more power supply units;
      causes the system to run in a first operating mode responsive to determining that the input power in the one or more power supply units has been lost wherein the set of data is not flushed to persistent storage in the first operating mode;
      determines that available energy in the set of one or more power supplies has dropped to a threshold, wherein the threshold is a systemwide energy threshold that is programmed based upon an amount of energy used to complete a cache flush operation; and
      performs a cache flush that transfers the set of data to persistent memory in the computing device to maintain the persistent memory state responsive to determining that the available energy in the set of one or more power supplies has dropped to the threshold.

10. The system of claim 9, wherein determining that the available energy in the one or more power supply units drops below the threshold comprises determining that a voltage across at least one bulk capacitor in the one or more power supply units has fallen below a threshold voltage.

11. The system of claim 9, wherein the system logic estimates an amount of energy available within a power supply using a counter that begins decrementing when a power supply unit signals that an energy threshold has been crossed, wherein the counter is decremented at a rate proportional to a worst case estimated load on that power supply.

12. The system of claim 9, wherein the system logic estimates a total amount of energy available within a plurality of power supplies by summing a set of energy counters maintained for the plurality of power supplies.

13. The system of claim 9, wherein determining the available energy in the set of one or more power supplies has dropped to a threshold comprises comparing a sum of a plurality of counters to a minimum energy threshold value, wherein the plurality of counters include at least one counter for each power supply unit of the one or more power supply units, wherein the threshold is satisfied when the sum of the plurality of counters is less than or equal to the minimum energy threshold value.

14. The system of claim 9, wherein the system logic powers down one or more hardware components that are not involved in performing the cache flush responsive to determining that the available energy in the set of one or more power supplies has dropped to the threshold.

15. The system of claim 9, wherein the system further comprises a processor and the system logic reduces a frequency of the processor responsive to determining that the available energy in the set of one or more power supplies has dropped to the threshold.

16. A system comprising:
  means for storing a set of data in volatile memory of a computing system, wherein the set of data is part of a persistent memory state but is not stored in nonvolatile storage;
  means for determining that an input power in a set of one or more power supply units has been lost;
  means for responsive to determining that input power in the set of one or more power supply units has been lost, running the computing system in a first operating mode, wherein the set of data is not flushed to persistent storage in the first operating mode;
  means for determining that available energy in the set of one or more power supplies has dropped to a threshold, wherein the threshold is a systemwide energy threshold that is programmed based upon an amount of energy used to complete a cache flush operation;
  means for responsive to determining that the available energy in the set of one or more power supplies has dropped to the threshold, performing a cache flush that transfers the set of data to persistent memory in the computing device to maintain the persistent memory state.

17. The system of claim 16, wherein means for determining that the available energy in the one or more power supply units drops below the threshold comprises means for determining that a voltage across at least one bulk capacitor in the one or more power supply units has fallen below a threshold voltage.

18. The system of claim 16, further comprising means for estimating an amount of energy available within a power supply using a counter that begins decrementing when a power supply unit signals that an energy threshold has been crossed, wherein the counter is decremented at a rate proportional to a worst case estimated load on that power supply.

19. The system of claim 16, further comprising means for estimating a total amount of energy available within a plurality of power supplies by summing a set of energy counters maintained for the plurality of power supplies.

20. The system of claim 16, wherein means for determining the available energy in the set of one or more power supplies has dropped to a threshold comprises means for comparing a sum of a plurality of counters to a minimum energy threshold value, wherein the plurality of counters include at least one counter for each power supply unit of the one or more power supply units, wherein the threshold is satisfied when the sum of the plurality of counters is less than or equal to the minimum energy threshold value.

* * * * *

UNITED STATES PATENT AND TRADEMARK OFFICE
CERTIFICATE OF CORRECTION

| | |
|---|---|
| PATENT NO. | : 12,019,556 B2 |
| APPLICATION NO. | : 17/704889 |
| DATED | : June 25, 2024 |
| INVENTOR(S) | : Fuller |

It is certified that error appears in the above-identified patent and that said Letters Patent is hereby corrected as shown below:

In the Drawings

On sheet 3 of 9, in FIG. 3, Line 12, delete "AGGREGRATE" and insert -- AGGREGATE --, therefor.

In the Specification

In Column 12, Line 65, delete "$t_{psu1\_v1warn}$" and insert -- $t_{psu1\_v1warn}$. --, therefor.

In Column 13, Line 5, delete "(($E_{v1warn}$+" and insert -- ($E_{v1warn}$+ --, therefor.

Signed and Sealed this
Tenth Day of December, 2024

Katherine Kelly Vidal
*Director of the United States Patent and Trademark Office*